UNITED STATES PATENT OFFICE.

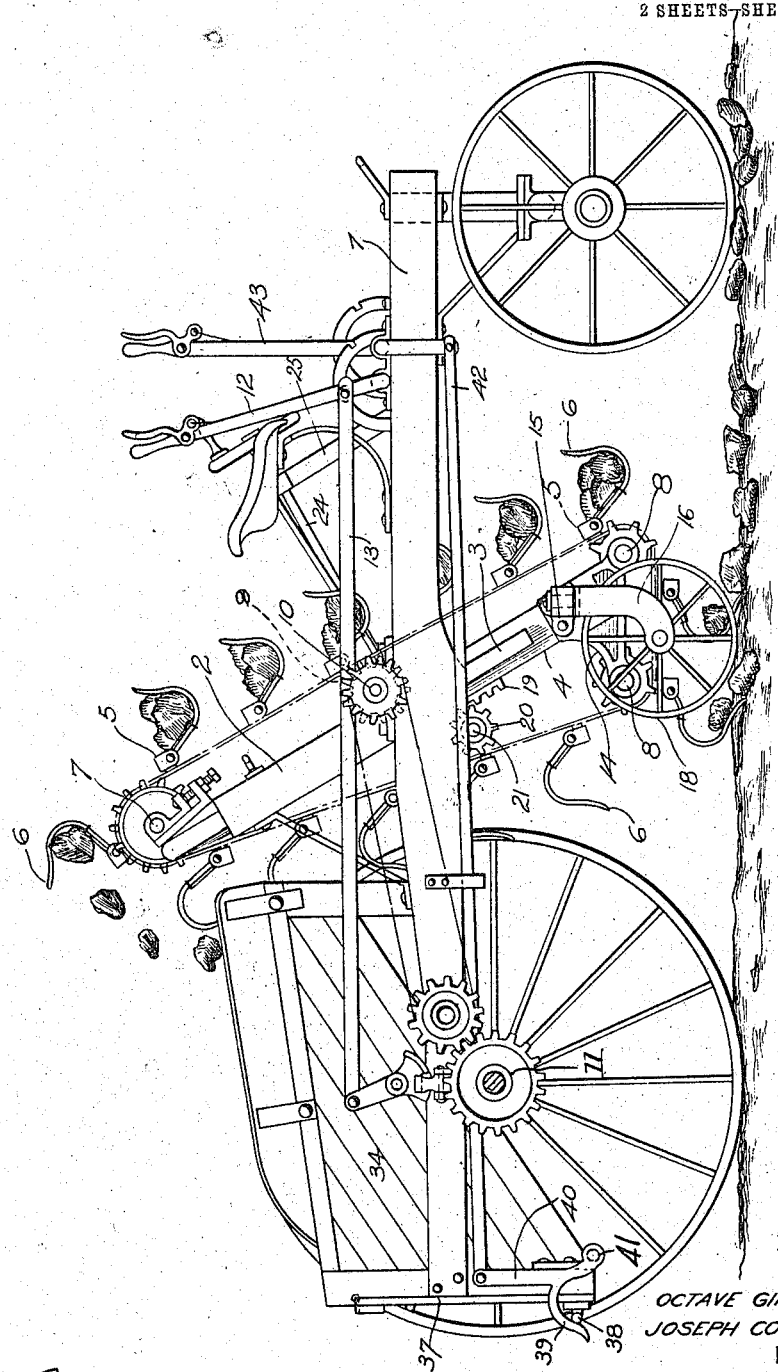

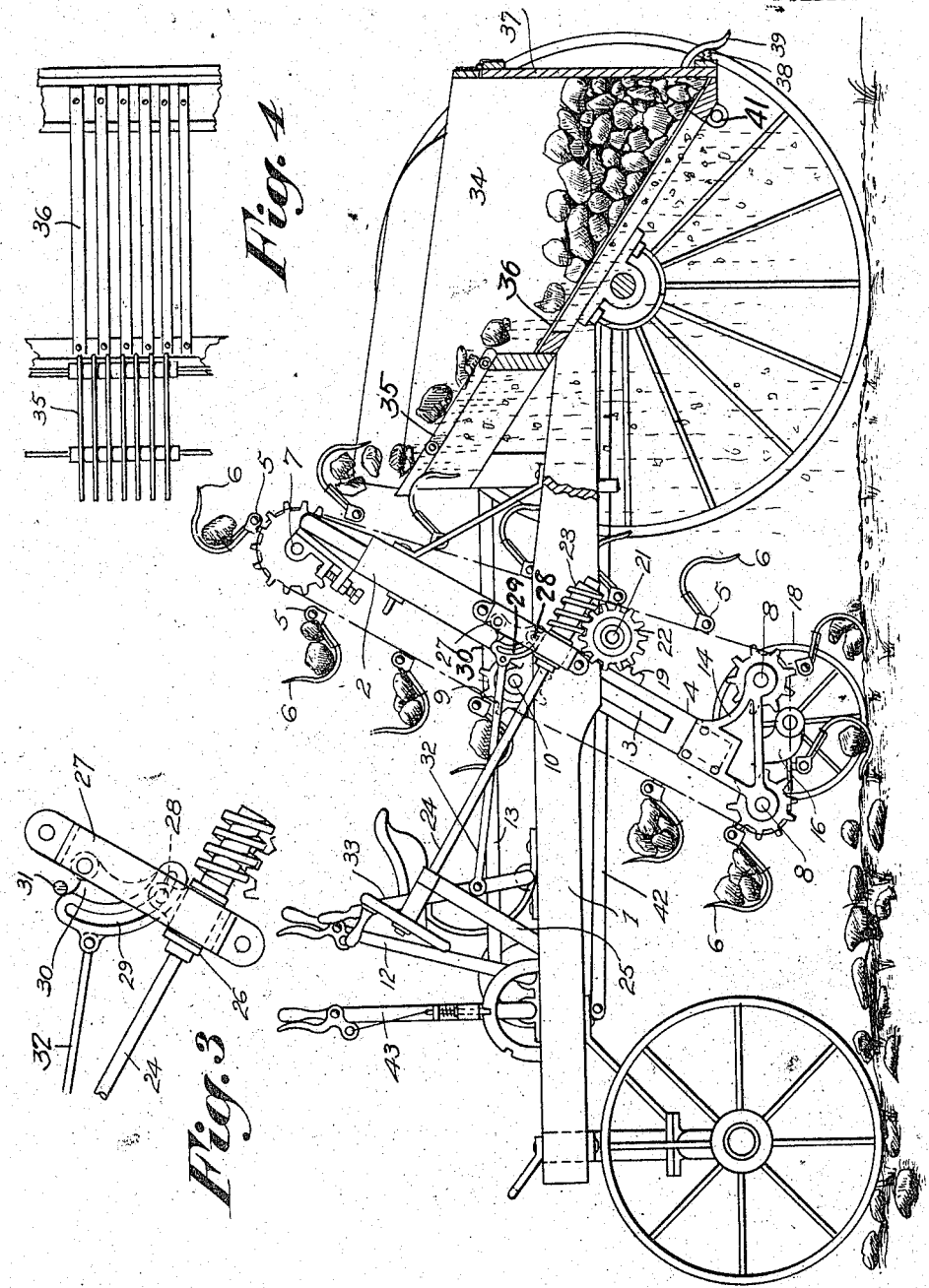

OCTAVE GINGRAS AND JOSEPH COUTURE, OF LAURIERVILLE, QUEBEC, CANADA.

STONE-PICKING MACHINE.

1,122,101.          Specification of Letters Patent.     Patented Dec. 22, 1914.

Application filed July 25, 1913. Serial No. 781,056.

*To all whom it may concern:*

Be it known that we, OCTAVE GINGRAS and JOSEPH COUTURE, both subjects of the King of Great Britain, residing at Laurierville, Province of Quebec, Canada, have invented certain new and useful Improvements in Stone-Picking Machines; and we do hereby declare that the following is a full, clear, and exact description of the invention, such as will enable others skilled in the art to which it appertains to make and use the same.

The invention to be hereinafter described relates to stone picking machines.

In order to more clearly disclose the construction, operation, and use of the invention, reference should be had to the accompanying drawings forming part of the present application.

Throughout the several figures of the drawings like reference characters designate the same parts.

In the drawings: Figure 1 is a side elevation of the machine; Fig. 2 is an opposite side elevation, partly in section; Fig. 3 is an enlarged detail view of the means for disengaging the worm; and Fig. 4 is a fragmentary plan view of the grate bottom.

The main objects of the invention are to provide a simple, efficient, economical, compact, and durable stone picking machine which may be readily built and constructed at a moderate cost.

Referring to the drawings in detail, 1 indicates a suitable wheeled supporting frame provided, at about the longitudinal center of its opposite sides, with rearwardly and upwardly inclined guide ways 2 of any suitable construction. In these guide ways are slidably mounted the guide rails 3 of the side beams 4 of an elevator. This elevator comprises two parallel sprocket chains carrying a plurality of parallel spaced slats 5 to each of which are hinged a plurality of substantially U shaped stone picking tines or teeth 6. Each of these hooks has a terminal part inclined outward so that it will be in position to slide conveniently under the stones when reaching the lowest position of its travel and moving forward horizontally for stone picking. The hooks of course fall forward successively to take this position. As they begin their ascent they fall backward on their hinges, becoming in effect pockets for carrying the stones, as clearly illustrated in Figs. 1 and 2. The width and thickness of the individual teeth, as well as the distance between any two successive teeth, will depend upon the nature of the work to be done. By using wide teeth placed closely together, the machine may be used for picking up comparatively small stones and gravel, while it is equally adaptable for stones of a much larger size by using equally strong teeth placed at considerable distances apart. The sprocket chains pass over and about upper and lower sets of sprocket wheels on transverse shafts 7 and 8, in the opposite ends of the beams 4. At the lower end, there are two such shafts, parallel, spaced apart, and extending horizontally, for a purpose to be later disclosed. The elevator is driven by means of sprocket wheels 9 on a transverse drive shaft 10 journaled in the frame 1. These sprocket wheels each engage one of the two sprocket chains of the elevator. The drive shaft is driven from the rear axle through chain and sprocket gear actuated by a gear 11 which is free on the axle but may be clutched thereto, at will, through the hand lever 12, link 13, and other suitable connections. These connections are of any usual and well known type and, therefore, it is not thought necessary to enter into further details of description of the same.

One of the main features of the machine is the thoroughness and efficiency of its operation. This is due, in great part, to the arrangement and disposition of the two lower shafts 8. By arranging them as shown in Figs. 1 and 2, the conveyer has a short horizontal travel at its lower end. This insures the operative engagement or positioning of each row of teeth before the last preceding row starts to rise from the surface with its load. In Figs. 1 and 2, it will be seen that one row has just completed loading and is starting up, a second is just getting its load, and a third is just in operative position and beginning to load. In this way, every part of the surface is thoroughly combed as the machine works forward and none of it is skipped, as would be the case without this lower, short, horizontal travel of the conveyer. Preferably, these two lower shafts 8 are journaled in triangular brackets or plates 14 solidly secured to the lower ends of beams 4. To the sides of these brackets are connected bearing blocks 15 on which are vertical swiveled axle brackets 16 of the conveyer supporting wheels 18. The vertical swivel of these wheels enables them to accommodate themselves readily to irregularities and to turn aside when meeting stones or the like, thus avoiding any sudden shocks or undue strains on the mechanism for raising and lowering the conveyer, to be presently described.

In order to slide the conveyer vertically in its guides, racks 19 and pinions 20 are provided. The racks are made fast to the under sides of beams 4 and the pinions mesh therewith and are made fast to a shaft 21 journaled in the under side of frame 1. The shaft 21 is provided with a gear 22 at one end which is driven by a worm 23 on the end of a rod 24. One end of the rod 24 is journaled in a bearing in the upper end of a bar or plate 25 secured to the main frame and the opposite end is journaled in a block 26 which is slidably mounted in a bracket 27. From the bearing block 26 a pin 28 projects. This pin plays in an arcuate eccentric slot 29 of a plate 30 which is pivoted to the guide way 2 beneath the upper part of the bracket 27, a stop pin 31 being provided to limit the swing of the plate. Plate 30 is pivotally connected by one corner to a link 32 the opposite end of which is similarly connected to a hand lever 33. Thus, by swinging the hand lever 33 in one direction or the other, the cam slotted plate 30 will be rocked to intermesh or unmesh the worm and gear, as desired. When unmeshed, the entire weight of the conveyer and its load will be supported on the wheels 18. This is particularly desirable when the machine is to travel over a fairly even and regular surface which is sufficiently solid to prevent embedding of the wheels 18, because, the conveyer will then follow close to the surface regardless of any rise or fall of either end of the frame relatively to the conveyer. On the other hand, if the surface is soft so that the wheels 18 will sink, it would be advisable to lower the conveyer until the wheels 18 just rest fairly firmly on the surface, and leave the worm and gear intermeshed. The gradual pitch of the worm acts as a lock, of course, to prevent accidental rotation of gear 22 in either direction, after adjustment, as will be readily understood. When it is desired to carry the machine from one field to another, or along a road, it is only necessary to raise the conveyer to such position that its teeth will be perfectly clear of the road or other surface.

As the conveyer travels upwardly, and just before it starts its downward travel, the stones, &c., carried by the forked tines will be delivered rearwardly into a cart body 34 having an inclined bottom formed of two grate sections 35 and 36 arranged in step fashion. The stones drop first on to section 35 and thence on to section 36, sliding downwardly on each and finally reaching the bottom corner or angle of the cart. During this travel over the grate sections, earth and small particles will be sifted out, as clearly shown in Fig. 2.

The rear of the cart body is provided with the usual end gate 37 hinged at its upper end to the cart body. Its lower end is provided with a bar or rod 38 the opposite ends of which project beyond the sides of the end gate. These projecting ends are engaged by closing and fastening hooks 39 carried on arms 40 fixed to the opposite ends of a rock shaft 41 which is journaled beneath the lower end of the cart body. The upper end of one of these arms is pivotally connected to one end of a long bar 42 the opposite end of which is similarly connected to the lower end of a hand lever 43. The length and curvature of the hooks 39 are such that their outer tips will engage over the projecting ends of the rod 38 when the tail gate is in closed position. By forcing the hand lever forward, the hooks 39 will be rocked downwardly, their curvatures giving a cam action or wedging closure on the rod ends, as will be clear. By swinging the hand lever in the opposite direction, the hooks will be raised to free the rod ends sufficiently to permit the tail gate to open for dropping the stones from the cart body.

It is thought that the construction, operation, and use of the invention will be clear from the preceding detailed description.

Changes may be made in the construction, arrangement, and disposition of the several parts of the invention without in any way departing from the field and scope of the same, and it is meant to include all such within this application wherein only a preferred form has been disclosed.

Having thus fully described our invention, what we claim as new and desire to secure by Letters Patent is:

1. An endless traveling elevator provided with stone-picking hooks, in combination with transporting wheels having a swiveled attachment to said elevator, permitting the machine to accommodate itself to irregularities and avoid obstructions.

2. An endless traveling elevator provided with stone-picking hooks, in combination with means for raising and lowering said elevator and guiding it in such movements, and transporting wheels having swiveled attachment to said elevator, permitting the machine to accommodate itself to irregularities and avoid obstructions.

3. An endless traveling elevator provided with a series of gathering hooks, in combination with a pair of shafts arranged to hold the lower end of said elevator horizontal as it travels over them, bearings for these shafts, wheels whereby the said elevator is supported and swiveling connections between these wheels and bearings.

In witness whereof we have hereunto set our hands in the presence of two witnesses.

OCTAVE GINGRAS.
JOSEPH COUTURE.

Witnesses:
I. THERRIEN,
G. H. CHÂTEAUVERT.